(12) United States Patent
Gong

(10) Patent No.: US 8,955,926 B2
(45) Date of Patent: Feb. 17, 2015

(54) ELECTRONIC DEVICE ENCLOSURE

(75) Inventor: Hai-Tao Gong, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 102 days.

(21) Appl. No.: 13/551,196

(22) Filed: Jul. 17, 2012

(65) Prior Publication Data

US 2013/0119837 A1    May 16, 2013

(30) Foreign Application Priority Data

Nov. 15, 2011    (CN) .......................... 2011 1 0361351

(51) Int. Cl.
*A47B 97/00* (2006.01)
*G06F 1/16* (2006.01)
*G06F 1/18* (2006.01)

(52) U.S. Cl.
CPC ...................................... *G06F 1/187* (2013.01)
USPC .................................. 312/223.2; 361/679.33

(58) Field of Classification Search
CPC ......... G06F 1/181; G06F 1/187; G06F 1/188; G11B 33/123; G11B 33/124; G11B 33/127; G11B 33/128
USPC ........... 312/223.1, 223.2, 257, 1; 361/679.02, 361/679.33, 679.37, 679.39; 248/27.1
See application file for complete search history.

(56) References Cited

U.S. PATENT DOCUMENTS

| | | | |
|---|---|---|---|
| 5,995,364 A * | 11/1999 | McAnally et al. | 361/679.31 |
| 6,215,664 B1 * | 4/2001 | Hernandez et al. | 361/725 |
| 6,879,484 B2 * | 4/2005 | Chou | 361/679.02 |
| 7,254,018 B2 * | 8/2007 | Zhang et al. | 361/679.33 |
| 7,643,280 B2 * | 1/2010 | Chen | 361/679.33 |
| 2003/0210520 A1 * | 11/2003 | Chien et al. | 361/685 |
| 2004/0075979 A1 * | 4/2004 | Wang et al. | 361/685 |
| 2005/0068720 A1 * | 3/2005 | Lambert et al. | 361/685 |
| 2008/0137280 A1 * | 6/2008 | Chen et al. | 361/685 |

* cited by examiner

*Primary Examiner* — James O Hansen
(74) *Attorney, Agent, or Firm* — Novak Druce Connolly Bove + Quigg LLP

(57) ABSTRACT

An electronic device enclosure includes a receiving case, a bracket rotatably attached to the receiving case, and a positioning member secured to the bracket. The receiving case includes a sliding rail. The positioning member includes a positioning portion, and the positioning portion is deformable. The positioning portion slidably engages with the sliding rail, for preventing the bracket from rotating relative to the receiving case.

11 Claims, 5 Drawing Sheets

ELECTRONIC DEVICE ENCLOSURE

BACKGROUND

1. Technical Field

The present disclosure relates to electronic device enclosures, more particularly to an electronic device enclosure for storage devices.

2. Description of Related Art

Many personal computers include data storage devices such as hard disk drives (HDDs), floppy disk drives, and compact disc-read only memory (CD-ROM) drives. In related art, the data storage devices are attached to a chassis of a computer enclosure using screws. When the storage device needs to be maintained or changed, accidents may occur with the screwdriver, that is, other electronic components near the storage device may be damaged. Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

Figure 1:
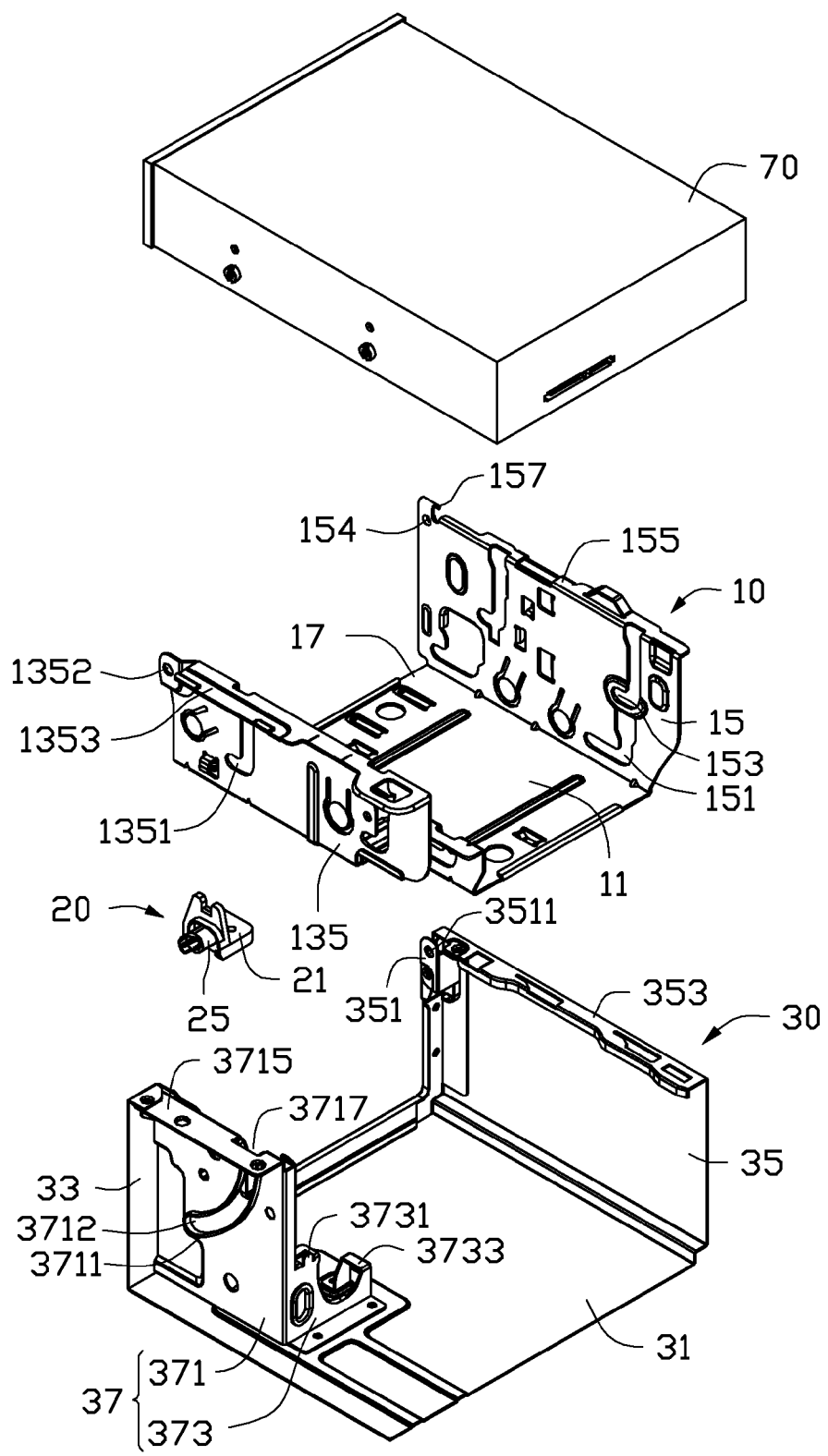
FIG. 1 is an exploded, isometric view of an electronic device enclosure, and a first storage device and a second storage device in accordance with an embodiment.
Figure 2:
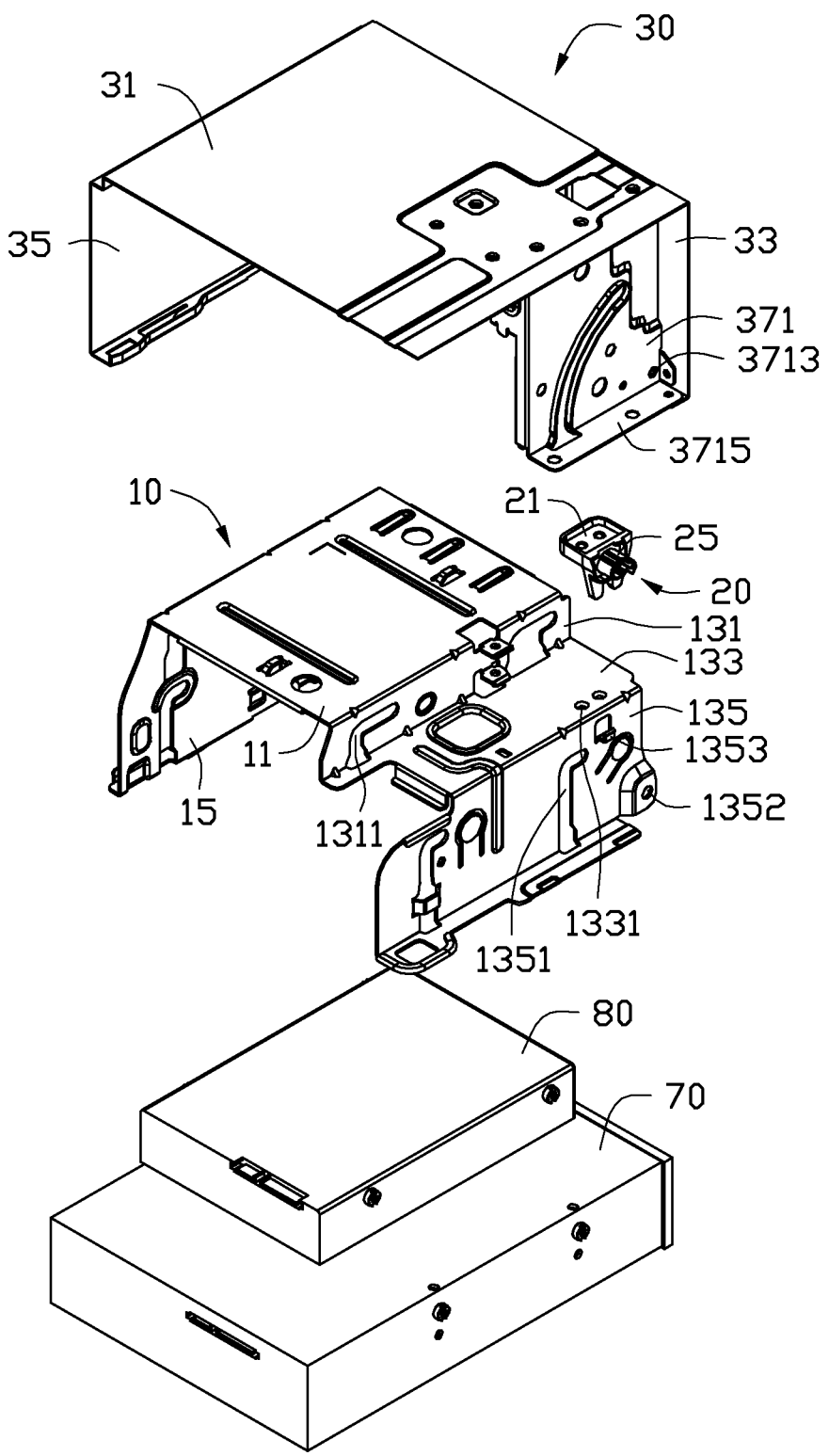
FIG. 2 is similar to FIG. 1, but viewed from a different aspect.

FIGS. 1 and 2 illustrate an electronic device enclosure in accordance with an embodiment. The electronic device enclosure includes a bracket 10, a positioning member 20 secured to the bracket 10, and a receiving case 30 for receiving the bracket 10. The bracket 10 is used to secure a first storage device 70 and a second storage device 80. The second storage device 80 is smaller than the first storage device 70.

The bracket 10 includes a bottom panel 11, a first side panel 131 extending from a first edge of the bottom panel 11, a second side panel 15 extending from a second opposite edge of the bottom panel 11, a third side panel 135, and a connecting panel 133 connected to the first side panel 131 and the third side panel 135. In one embodiment, the first side panel 131 is substantially parallel to the second side panel 15 and the third side panel 135, and the connecting panel 133 is substantially parallel to the bottom panel 11 and perpendicular to the first side panel 131. The first storage device 70 is located between the second side panel 15 and the third side panel 135, and the second storage device 80 is located between the second side panel 15 and the first side panel 131.

Two first clipping slots 1311 are defined in the first side panel 131. Two through holes 1331, adjacent to the third side panel 135, are defined in the connecting panel 133. Two second clipping slots 1351 and a first mounting hole 1352 are defined in the third side panel 135. A clamping tongue 1353 extends outwardly from the third side panel 135.

Two third clipping slots 151 and two fourth clipping slots 153 are defined in the second side panel 15. The two third clipping slots 151 and the two fourth clipping slots 153 correspond to the two first clipping slots 1311 and the two second clipping slots 1351. In one embodiment, the two first clipping slots 1311, the two second clipping slots 1351, the two third clipping slots 151, and the two fourth clipping slots 153 have a same L-shaped configuration. A second mounting hole 154 is defined in the second side panel 15. A hook 157, adjacent to the second mounting hole 154, extends from an upper edge of the second side panel 15. Two flanges 155, 1353 extend from the second side panel 15 and the third side panel 135.

Figure 3:
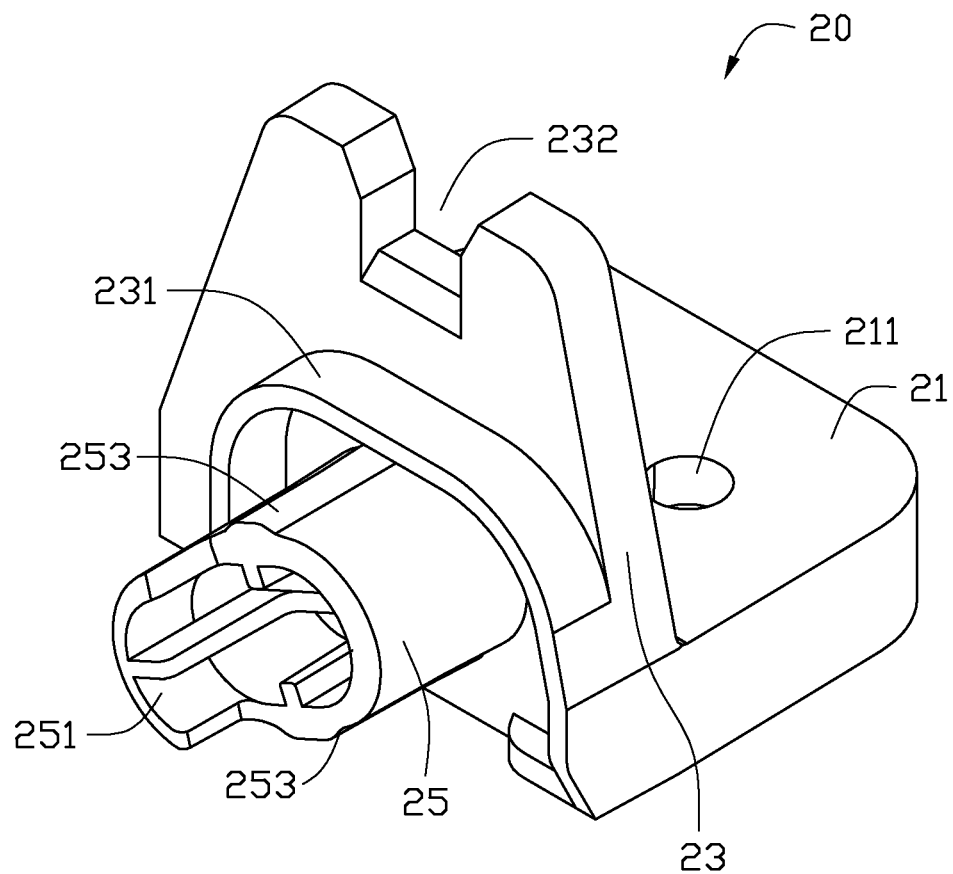
FIG. 3 is an isometric view of a positioning member of the electronic device enclosure of FIG. 1.

FIG. 3 illustrates the positioning member 20 of one embodiment. The positioning member 20 includes a securing portion 21, a clamping portion 23, and a positioning portion 25. Two fixing holes 211 are defined in the securing portion 21 and correspond to the two through holes 1331. The clamping portion 23 extends substantially perpendicularly from an upper surface of the securing portion 21. A shielding portion 231 extends from the clamping portion 23 and is above the positioning portion 25, for preventing cables touching or interfering with the positioning portion 25. In one embodiment, a cross-section of the shielding portion 231 is arcuate. A clamping slot 232, with a guiding surface 2321, is defined in the center of the clamping portion 23. In one embodiment, the guiding surface 2321 is slanted, and the clamping slot 232 is U-shaped. An inserting portion 251 extends from the distal end of the positioning portion 25, and two protruding portions 253 protrude from the positioning portion 25 and are located on a side of the inserting portion 251. In one embodiment, the positioning portion 25 is hollow column and deformable, and the inserting portion 251 is semi-circular.

FIGS. 1-2, illustrate the receiving case 30 of one embodiment. The receiving case 30 includes a bottom plate 31, a front plate 33, a side plate 35, and a tray 37 attached to the bottom plate 31. A retaining piece 351, with a retaining hole 3511, is attached to the front of the side plate 35. The tray 37 includes a mounting plate 371 and a supporting plate 373 connected to the front plate 33. The supporting plate 373 is substantially perpendicular to the mounting plate 371 and substantially parallel to the front plate 33. In one embodiment, the mounting plate 371 is substantially parallel to the front plate 33. Two supporting flanges 3715, 353 extend from the mounting plate 371 and the side plate 35. A sliding rail 3711, with a sliding slot 3712, is defined in the mounting plate 371, and a guiding slot 3717 is defined in the supporting flange 3715. The guiding slot 3717 communicates with the sliding slot 3712. In one embodiment, the sliding rail 3711 and the sliding slot 3712 are arcuate. A third mounting hole 3713 is defined in the mounting plate 371 corresponding to the first mounting hole 1352. A blocking tab 3731 and a supporting stage 3733 are located on the supporting plate 373.

Figure 4:
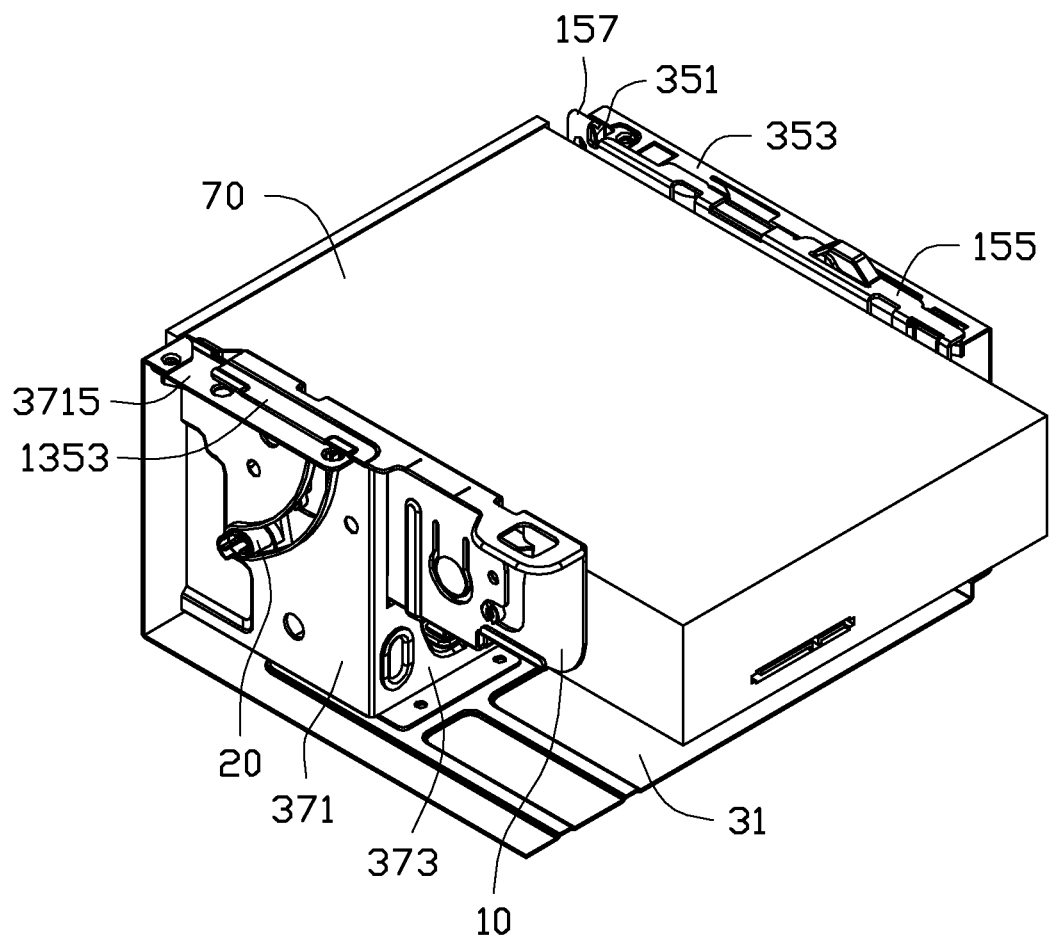
FIG. 4 is an assembled view of the items of FIG. 1.
Figure 5:
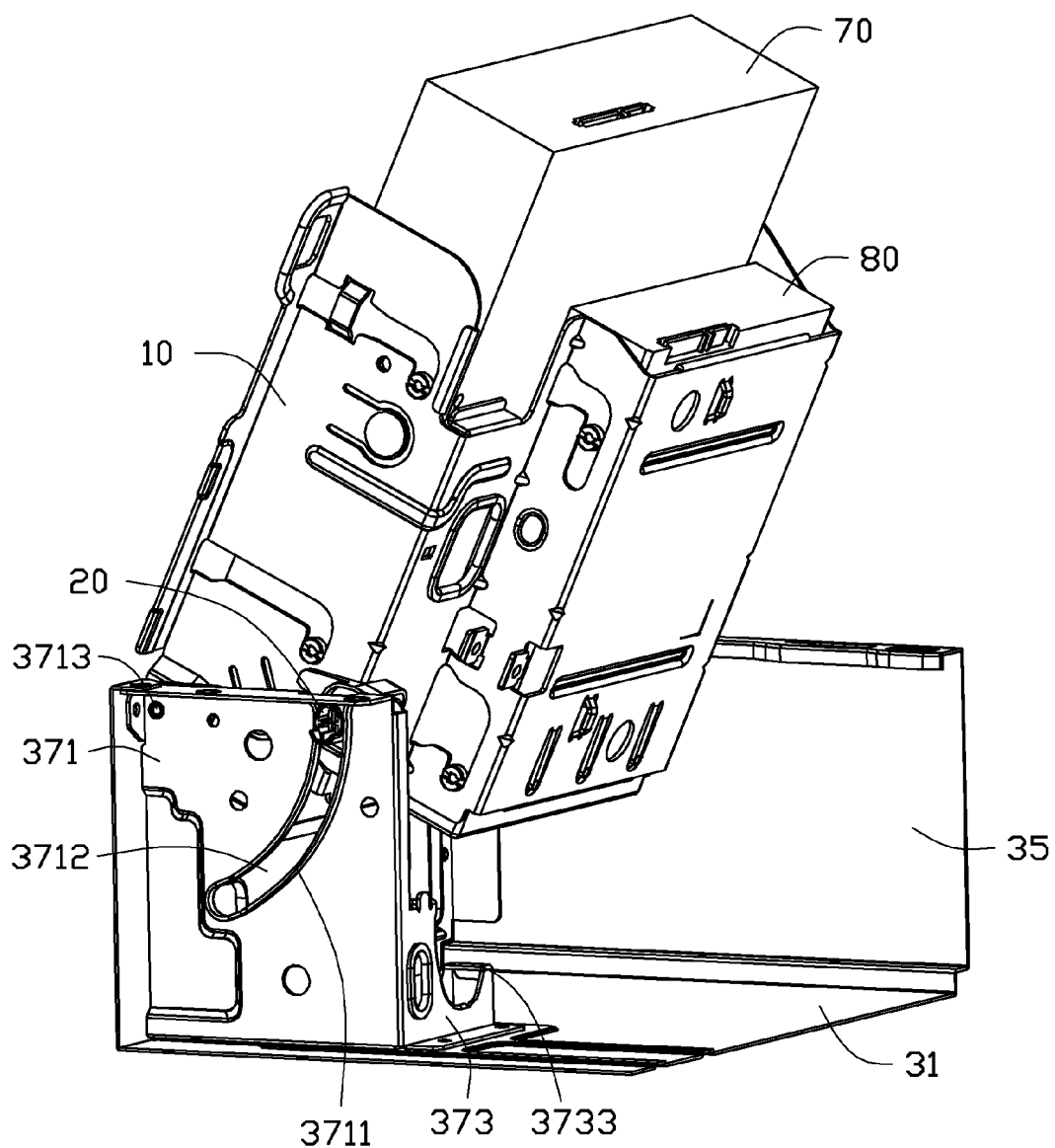
FIG. 5 is an assembled view of the items of FIG. 1, but viewed from a different aspect and showing a bracket rotated relative to a receiving case.

FIGS. 4-5 illustrate the assembly of the electronic device enclosure in accordance with an embodiment. In assembly, the securing portion 21 abuts the connecting panel 133, and the clamping tongue 1353 is clamped into the clamping slot 232 via the guiding surface 2321, to secure the clamping portion 23 to the third side panel 135. The fixing holes 211 are aligned with the through holes 1331, and two fixing members (not shown), such as screws, are engaged into the fixing holes 211 and the through holes 1331. Thus, the securing portion 21 is secured to the connecting panel 133.

The first mounting hole 1352 is aligned with the third mounting hole 3713, and the second mounting hole 154 is aligned with the fourth mounting hole 3511. A plurality of mounting members, such as screws, are engaged in the first mounting hole 1352 and the third mounting hole 3713, and engaged in the second mounting hole 154 and the fourth mounting hole 3511, to rotatably secure the bracket 10 to the receiving case 30. The bracket 10 is rotated relative to the receiving case 30, until the inserting portion 251 is received in the guiding slot 3717, and the hook 157 abuts the retaining piece 351.

The bracket 10 is further rotated, and the positioning portion 25 is slid into the sliding slot 3712 to engage the two protruding portions 253 with the opposite edges of the sliding rail 3711. The positioning portion 25 is deformed by the sliding rail 3711, until the hook 157 clips onto the retaining piece 351. At this point, the flanges 155, 153 abut the supporting flanges 3715, 353. The connecting panel 133 abuts the supporting plate 373 to clip the blocking tab 3731 in a hole (not shown) of the connecting panel 133, and the bottom panel 11 abuts the supporting stage 3733. The first storage device 70 is located between the second side panel 15 and the third side panel 135, and two first mounting members (not labeled) of the first storage device 70 are received in the second and fourth clipping slots 1351 and 153. The second storage device 80 is located between the second side panel 15 and the first side panel 131, and two second mounting members (not labeled) of the second storage device 80 are received in the first and third clipping slots 1311 and 151. Thus, the storage devices 70 and 80 are secured to the bracket 10.

In one embodiment, the positioning portion 25 is made of polycarbonate and glass fibre, and the receiving case 30 is made of metal. Thus, the positioning portion 25 can be an interference fit with the sliding rail 3711 via the two protruding portion 253. Friction is generated between the two protruding portions 253 and the sliding rail 3711. When the bracket 10 is rotated relative to the receiving case 30, the positioning portion 25 is slid in the sliding slot 3712 and the positioning portion 25 can be positioned and held in position anywhere along the sliding rail 3711, via the friction generated between the two protruding portions 253 and the sliding rail 3711.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. An electronic device enclosure comprising:
   a receiving case comprising a sliding rail, a mounting plate, and a supporting flange substantially perpendicular to the mounting plate; the sliding rail being located on the mounting plate and comprising a sliding slot for receiving the positioning portion; the supporting flange defining a guiding slot communicating with the sliding slot of the sliding rail;
   a bracket rotatably attached to the receiving case; the bracket comprising a connecting panel, a first side panel, a second side panel, and a third side panel; and
   a positioning member secured to the bracket and comprising a positioning portion and a securing portion, wherein the positioning portion is deformable, and the securing portion is secured to the connecting panel;
   wherein an inserting portion extends from the positioning portion and extends through the sliding slot, the connecting panel is connected to the second side panel and the third side panel; the first side panel and the second side panel are adapted to receive a first storage device, and the second side panel and the third side panel are adapted to receive a second storage device; the positioning member further comprises a clamping portion substantially perpendicular to the securing portion, the clamping portion defining a clamping slot; and the third side panel comprises a clamping tongue engaged in the clamping slot, and the positioning portion is slidably engaged with the sliding rail, for preventing the bracket from rotating relative to the receiving case.

2. The electronic device enclosure of claim 1, wherein two protruding portions protrude from an outer surface of the positioning portion and are engaged with opposite edges of the sliding rail.

3. The electronic device enclosure of claim 1, wherein the connecting panel is substantially perpendicular to the first side panel and the third side panel, and the first side panel is substantially parallel to the third side panel.

4. The electronic device enclosure of claim 1, wherein the positioning member further comprises a shielding portion extending from the clamping portion and above the positioning portion; and a cross-section of the shielding portion is arcuate, for preventing cables from surrounding the positioning portion.

5. The electronic device enclosure of claim 1, wherein the positioning portion is a hollow column, and the sliding rail is arcuate.

6. An electronic device enclosure comprising:
   a receiving case comprising a bottom plate, a mounting plate, and a supporting plate substantially perpendicular to the bottom plate and the mounting plate; the mounting plate comprising a sliding rail; the sliding rail comprising a sliding slot;
   a bracket rotatably attached to the receiving case and abutting the supporting plate; the bracket comprising a first side panel, a second side panel, a third side panel, and a connecting panel connected to the second side panel and the third side panel;
   a positioning member comprising a positioning portion; the positioning member is secured to the connecting panel and clipped with the third panel; two protruding portions protruding from the positioning portion, and the positioning portion being deformable;
   wherein the supporting plate comprises a blocking tab and a supporting stage, the blocking tab extends from an upper edge of the supporting plate and is engaged in a hole of the connecting panel, the supporting stage supports the bracket, the positioning portion is slidably received in the sliding slot, and the two protruding portions are engaged with opposite edges of the sliding rail, for preventing the bracket from rotating relative to the receiving case;
   wherein an inserting portion extends from the positioning portion, and the inserting portion extends through the sliding slot and located in an outer surface of the mounting plate;
   wherein the receiving case further comprises a supporting flange substantially perpendicular to the mounting plate, and the supporting flange defines a guiding slot communicating with the sliding slot.

7. The electronic device enclosure of claim 6, wherein the connecting panel is substantially perpendicular to the first side panel and the third side panel, and the first side panel is substantially parallel to the third side panel.

8. The electronic device enclosure of claim 6, wherein the positioning member further comprises a securing portion, and the securing portion is secured to the connecting panel.

9. The electronic device enclosure of claim 6, wherein the positioning member further comprises a clamping portion substantially perpendicular to the securing portion, and the clamping portion defines a clamping slot; and the third side panel comprises a clamping tongue engaged in the clamping slot.

10. The electronic device enclosure of claim 9, wherein the positioning member further comprises a shielding portion extending from the clamping portion and above the positioning portion, and a cross-section of the shielding portion is arcuate, for preventing cables from surrounding the positioning portion.

11. The electronic device enclosure of claim 6, wherein the positioning portion is a hollow column, and the sliding rail and the sliding slot are arcuate.

* * * * *